United States Patent
Bensmann et al.

(10) Patent No.: US 11,873,107 B2
(45) Date of Patent: Jan. 16, 2024

(54) PICCOLO TUBE FOR DE-ICING AN AIRFOIL STRUCTURE OF AN AIRCRAFT, DE-ICING SYSTEM AND AIRFOIL STRUCTURE

(71) Applicant: Airbus Operations GmbH, Hamburg (DE)

(72) Inventors: Stefan Bensmann, Weyhe (DE); Marcus Erban, Bremen (DE); Martin Fees, Rotenburg (DE)

(73) Assignee: AIRBUS OPERATIONS GmbH, Kreetslag (DE)

( * ) Notice: Subject to any disclaimer, the term of this patent is extended or adjusted under 35 U.S.C. 154(b) by 0 days.

(21) Appl. No.: 17/718,899

(22) Filed: Apr. 12, 2022

(65) Prior Publication Data

US 2022/0324578 A1    Oct. 13, 2022

(30) Foreign Application Priority Data

Apr. 13, 2021    (EP) .................................... 21168198

(51) Int. Cl.
*B64D 15/04*    (2006.01)
(52) U.S. Cl.
CPC .................................... *B64D 15/04* (2013.01)
(58) Field of Classification Search
CPC ............ B64D 15/04; B64D 15/02; B64C 9/02
See application file for complete search history.

(56) References Cited

U.S. PATENT DOCUMENTS

| | | | |
|---|---|---|---|
| 5,841,079 A | 11/1998 | Parente | |
| 6,119,978 A * | 9/2000 | Kobayashi | B64C 3/28 244/35 R |
| 8,061,657 B2 * | 11/2011 | Rocklin | B64D 15/04 138/116 |
| 8,100,364 B2 | 1/2012 | Nieman et al. | |
| 10,005,545 B2 * | 6/2018 | Alderman | B64C 21/06 |
| 10,486,821 B2 | 11/2019 | Mackin et al. | |
| 2009/0152401 A1 | 6/2009 | Sternberger | |

(Continued)

FOREIGN PATENT DOCUMENTS

EP    3 205 580    8/2017

OTHER PUBLICATIONS

Extended European Search Report for Application No. EP21168198. 6, dated Jul. 13, 2021, 8 pages.

*Primary Examiner* — Joshua J Michener
*Assistant Examiner* — Cindi M Curry
(74) *Attorney, Agent, or Firm* — Nixon & Vanderhye P.C.

(57) ABSTRACT

A piccolo tube for de-icing an airfoil structure of an aircraft is disclosed having a shape extending in a longitudinal direction and is configured for installation in an airfoil structure of an aircraft in the longitudinal direction of the airfoil structure. The piccolo tube includes a connector element for receiving heated air from a supply source, and a longitudinally extending air duct having a plurality of outlet openings arranged along the air duct, for supplying and distributing the heated air along the inner side of the airfoil structure. The piccolo tube is curved and its curvature is adapted to a curvature of the airfoil structure in its longitudinal direction. A de-icing system includes the piccolo tube and a supply source for supplying heated air to the piccolo tube. An airfoil structure includes the piccolo tube and/or the de-icing system.

16 Claims, 6 Drawing Sheets

(56) References Cited

U.S. PATENT DOCUMENTS

| | | |
|---|---|---|
| 2010/0176243 A1 | 7/2010 | Nieman et al. |
| 2012/0187254 A1 | 7/2012 | Wollaston |
| 2013/0320150 A1* | 12/2013 | Reckzeh ................. B64C 21/02 244/199.4 |
| 2017/0166313 A1* | 6/2017 | Saeed .................... B64D 33/02 |
| 2019/0389588 A1* | 12/2019 | Zha ........................ F15D 1/008 |
| 2020/0148368 A1* | 5/2020 | Bensmann ................ B64C 3/26 |
| 2020/0307765 A1* | 10/2020 | Antunes ................... B64C 9/22 |
| 2021/0024221 A1* | 1/2021 | Huet ...................... B64D 15/04 |

\* cited by examiner

PICCOLO TUBE FOR DE-ICING AN AIRFOIL STRUCTURE OF AN AIRCRAFT, DE-ICING SYSTEM AND AIRFOIL STRUCTURE

CROSS REFERENCE TO RELATED APPLICATION

This application claims priority to and incorporates by reference the entirety of European Patent Application Number EP 21168198.6, filed Apr. 13, 2021.

BACKGROUND

The invention relates to a piccolo tube for de-icing an airfoil structure of an aircraft, a de-icing system for an airfoil structure of an aircraft, and an airfoil structure.

To remove ice from the outer surfaces of airfoil structures, like e.g. wings, slats of the wings, etc., or to prevent that ice is formed thereon, de-icing systems which are also called anti-icing systems are used. In some de-icing systems, bleed air at high temperature and high pressure which is extracted from an engine compressor is cooled to a predetermined temperature, and is blown to the inner surface of the airfoil structure, thereby heating it and removing ice from the outer surface or preventing the outer surface from being iced.

For supplying and distributing the heated air to the inner surfaces of the airfoil structure, a member which is called piccolo tube is used. The piccolo tube forms an air duct within the airfoil structure and has in its longitudinal direction a plurality of ejection holes through which the heated air is ejected and blown on the inner surfaces of the airfoil structure. The piccolo tube is for example disposed near the leading edge along a wing length direction.

EP 3 205 580 A1 describes an anti-icing system, which blows heated air to a curved inner surface of a main wing of an aircraft. The anti-icing system includes a piccolo tube that includes a flow path through which the heated air flows in a longitudinal direction from a rear end to a front end, and a plurality of ejection holes provided along the longitudinal direction to make the flow path communicate with an outside, and an engine that supplies the heated air towards the piccolo tube.

U.S. Pat. No. 8,100,364 B2 describes an anti-icing piccolo tube standoff structure for supporting a piccolo tube within a slat.

FIG. 2 shows an example of known aircraft 200 having a fuselage 210 and a pair of wings 220. Each wing 220 is equipped with a slat comprising a known piccolo tube in its interior. An engine 230 is fixed to each wing 220.

A disadvantage of the piccolo tubes is that they significantly limit the layout of air-foil structures, like e.g. slats or slat structures, which are equipped with piccolo tubes, as the piccolo tubes just fit in a specific position in the airfoil structure, and therefore define the interface point, slat rib cut outs, spar position, etc. Thus, the constraints imposed by the piccolo tubes have a big impact on the design options of the airfoil structure and of the wing.

SUMMARY

The invention contemplates increasing the freedom of designing the layout of air-foil structures equipped with piccolo tubes, so that improved wings can be developed with reduced design constraints.

A piccolo tube for de-icing an airfoil structure of an aircraft, the piccolo tube having a shape extending in a longitudinal direction and being configured for installation in an airfoil structure of an aircraft in the longitudinal direction of the airfoil structure, the piccolo tube comprising a connector element for receiving heated air from a supply source, and a longitudinally extending air duct having a plurality of outlet openings arranged along the air duct, for supplying and distributing the heated air along the inner side of the airfoil structure, wherein the piccolo tube is curved and its curvature is adapted to a curvature of the airfoil structure in its longitudinal direction.

The invention achieves that a wider range of options for improvements with respect to aerodynamics, anti-icing performance and engines are available, because the design constraints for the airfoil structure imposed by the piccolo tube and the de-icing system are reduced. In particular, the engine size and the curvature of the slat adapted to the shape of the engine can be increased. The invention provides more options which have an influence on the wing layout.

The airfoil structure may be any structure which causes an aerodynamic force perpendicular to the direction of motion of the aircraft, like e.g. a wing, a part of the wing, a slat, a fixed leading edge module of the aircraft, etc.

At least a portion of the piccolo tube may have a constant curvature radius.

At least a portion of the piccolo tube may be bended vertically in the installed state.

At least a portion of the curvature of the airfoil structure may be adapted to an outer circumference of an engine of the aircraft.

The airfoil structure may be a slat.

The piccolo tube may comprise one or more guiding elements integrally formed with the piccolo tube and configured for guiding the piccolo tube during assembly in the airfoil structure.

The piccolo tube may comprise a removable guiding tool for guiding the piccolo tube during assembly in the airfoil structure.

According to an exemplary embodiment, a de-icing system for an airfoil structure of an aircraft is provided, comprising a piccolo tube according to the invention and a supply source for supplying heated air to the piccolo tube.

According to an exemplary embodiment, an airfoil structure for an aircraft is provided, comprising a piccolo tube according to the invention and/or a de-icing system according to the invention.

At least a portion of the piccolo tube and the airfoil structure may be bended vertically in the assembled state of the aircraft.

At least a portion of the curvatures of the airfoil structure and the piccolo tube may be installed therein are adapted to an outer circumference of an engine of the aircraft.

The airfoil structure may be a slat or may comprise a slat.

The airfoil structure may comprise one or more guiding elements integrally formed with the airfoil structure and configured for guiding the piccolo tube when it is installed in the airfoil structure The airfoil structure may comprise one or more ribs having a cut out for supporting the piccolo tube in the airfoil structure.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

Figure 1A:
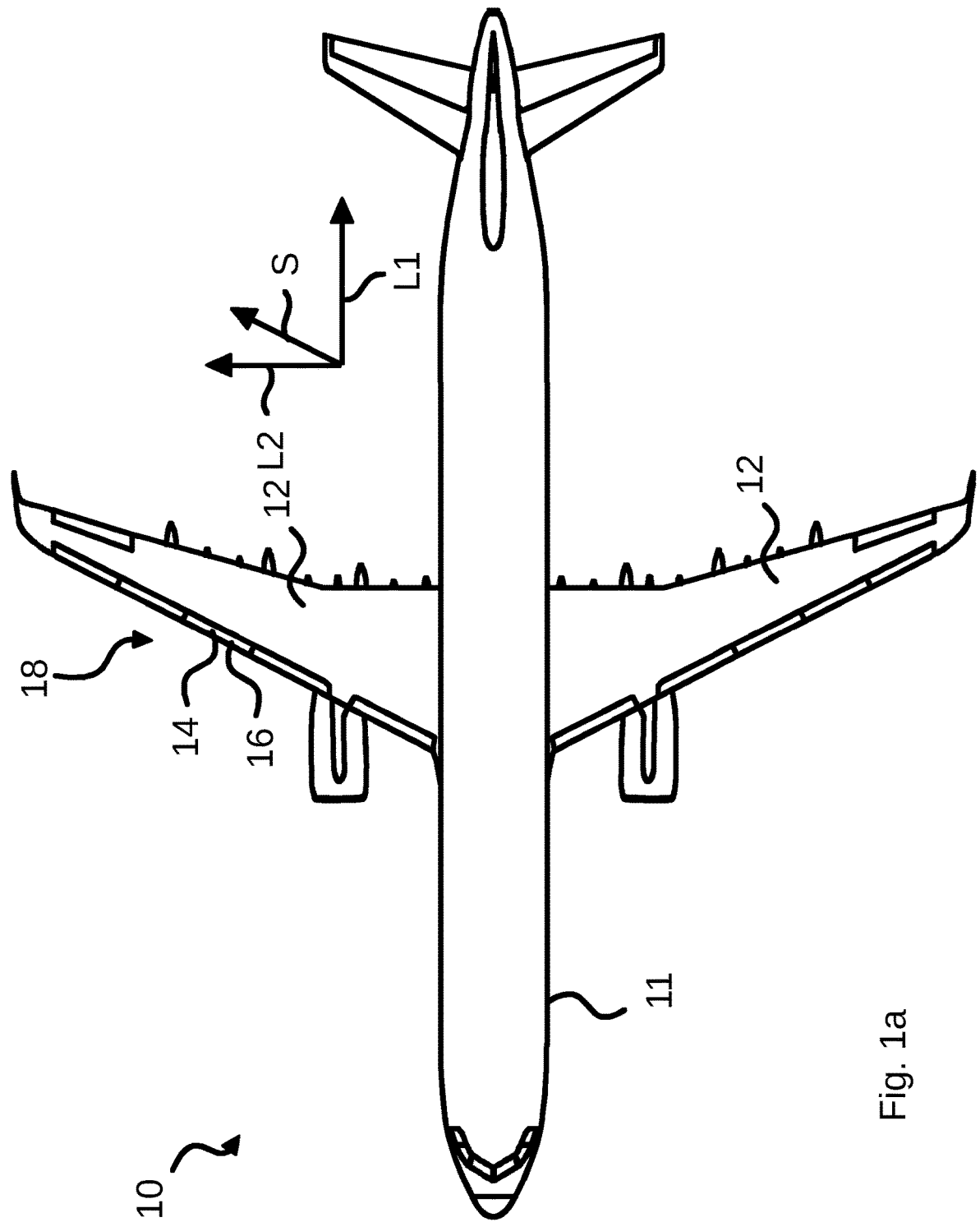
FIGS. 1(a) and 1(b) depict a schematic top view and front view of an aircraft comprising an airfoil structure and a piccolo tube according to an exemplary embodiment.
Figure 1B:
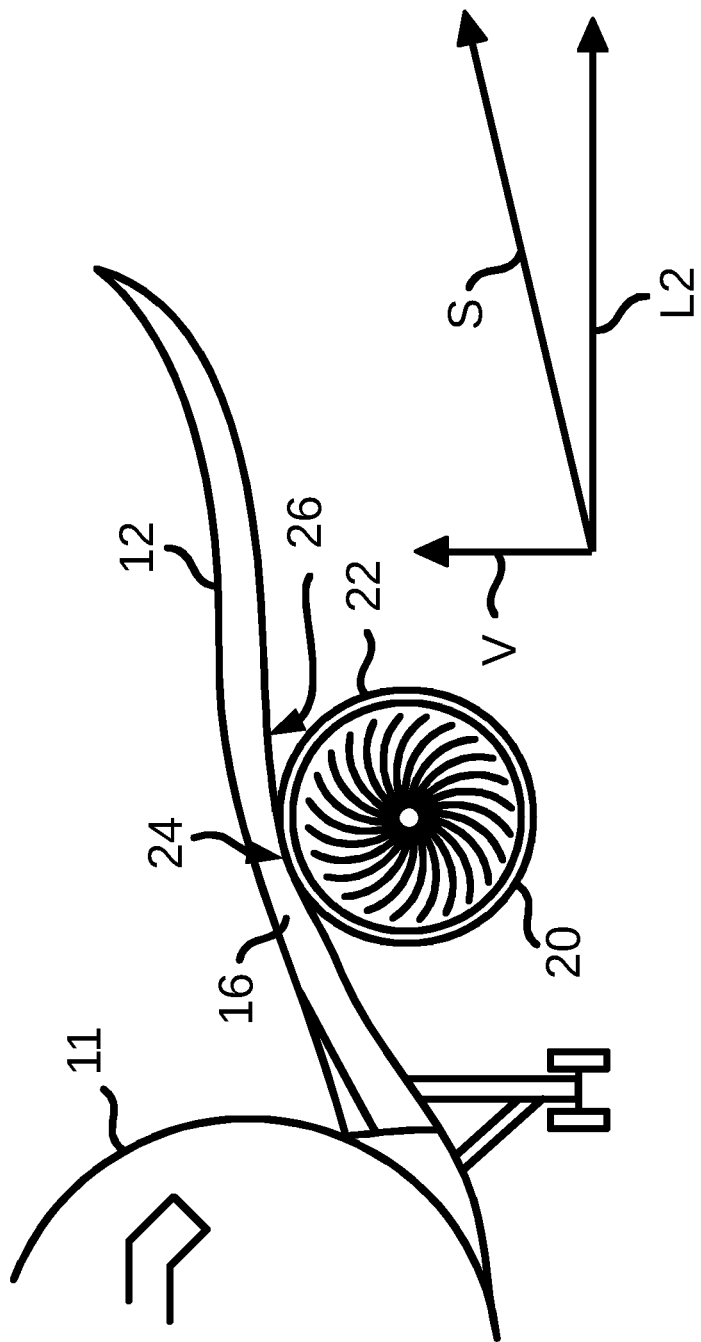

Reference is made to Figs. 1a and 1b which depict an aircraft 10. The aircraft 10, in a usual manner, comprises a pair of wings 12 attached to a fuselage 11. Each wing 12 forms or comprises an airfoil structure and is equipped with at least one high-lift device 14, for example a slat 16.

As shown in FIG. 1a, each wing 12 extends in a direction which usually has components of three axes of the aircraft 10 being orthogonal to each other, namely a longitudinal axis L1, a lateral axis L2 and a vertical axis V, which is orthogonal to the image plane of FIG. 1a and shown in FIG. 1b.

Usually, the direction in which the wing 12 extends between the fuselage 11 of the aircraft and the wing tip is called the spanwise direction S of the wing. The spanwise direction S extends in the plane of the wing 12. In particular it may be parallel to the leading edge of the wing 12. However, it may also deviate from being parallel to the leading edge in certain cases, depending on the specific shape of the wing. The spanwise direction S is also depicted in FIG. 1b, together with the vertical axis V and the lateral axis L2.

The wing 12 or a portion thereof and the high-lift device 14 may form a high-lift airfoil arrangement 18. It's spanwise direction is for example the same direction as the spanwise direction S of the wing 12 or parallel thereto.

Figure 2:
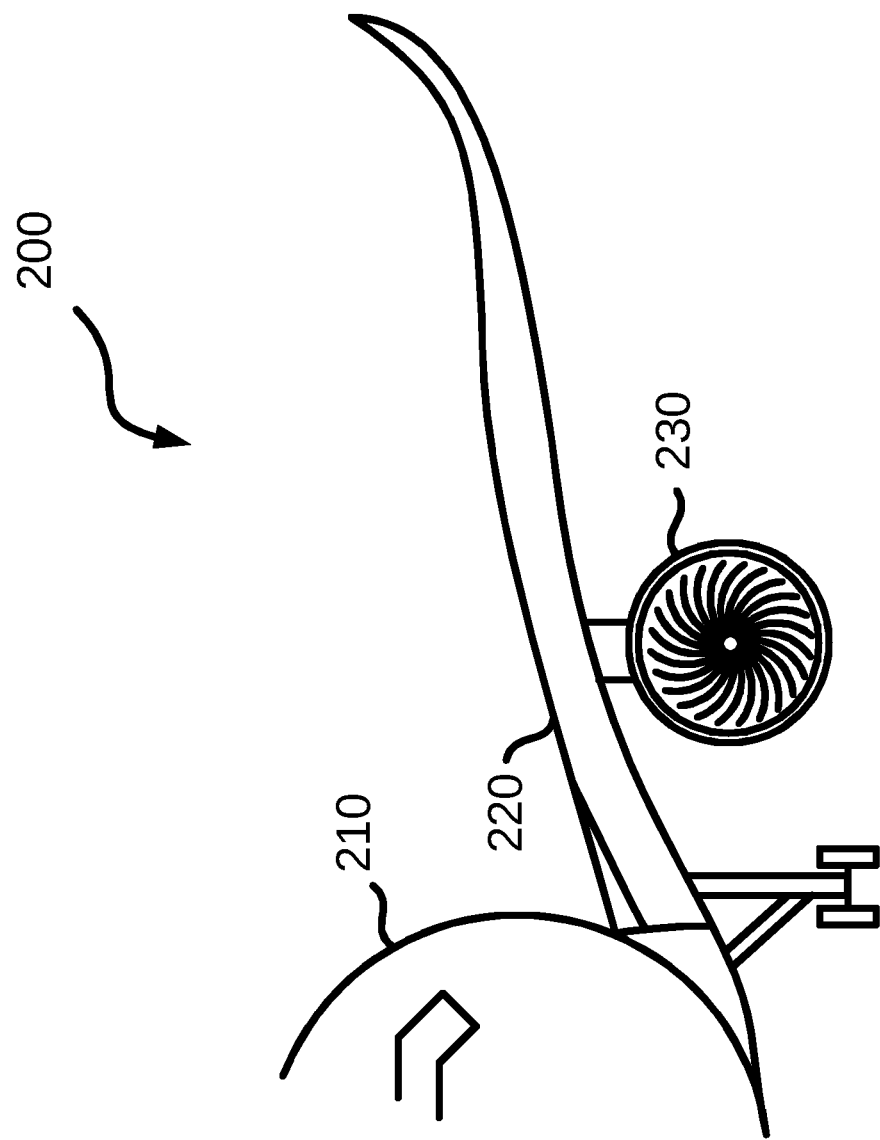
FIG. 2 depicts a schematic front view of an aircraft according to the state of the art comprising a known airfoil structure.

A large-sized engine 20, which has an increased diameter compared to engines mainly used hitherto in aircrafts as shown in FIG. 2, is attached at the underside of the airfoil structure formed by the wing 12. An outer circumference 22 of the big engine 20 has a round shape and is adjacent to the surface 26 at the underside of the wing 12. The wing 12 is curved, in particular around the engine 20, wherein the curvature of a part of the wing 12 adjacent to engine 20 is adapted to the curvature of the outer circumference 22 of the engine 20. Thus, a portion of the engine's circumferential surface 24 is adjacent and parallel to a part of the surface 26 of the wing 12. The wing 12 further comprises another curved portion located closer to the wing tip than the part adjacent to the engine 20.

The figure shows an example why wings, and therefore slats might be more curved in future. It doesn't necessarily mean that the curvature of the engine is adapted by the wing and therefore by the slats and therefore by the piccolo tube. The wing may have a different shape than the engine or the engine nacelle. Hence the wing might be more curved close to the engine, and it might have a seagull shape, as shown in FIG. 1b, but it still needs to fulfill aerodynamic requirements. It also allows sufficient space below the wing for the nacelle, which might result in a different shape than the nacelle.

Figure 3:
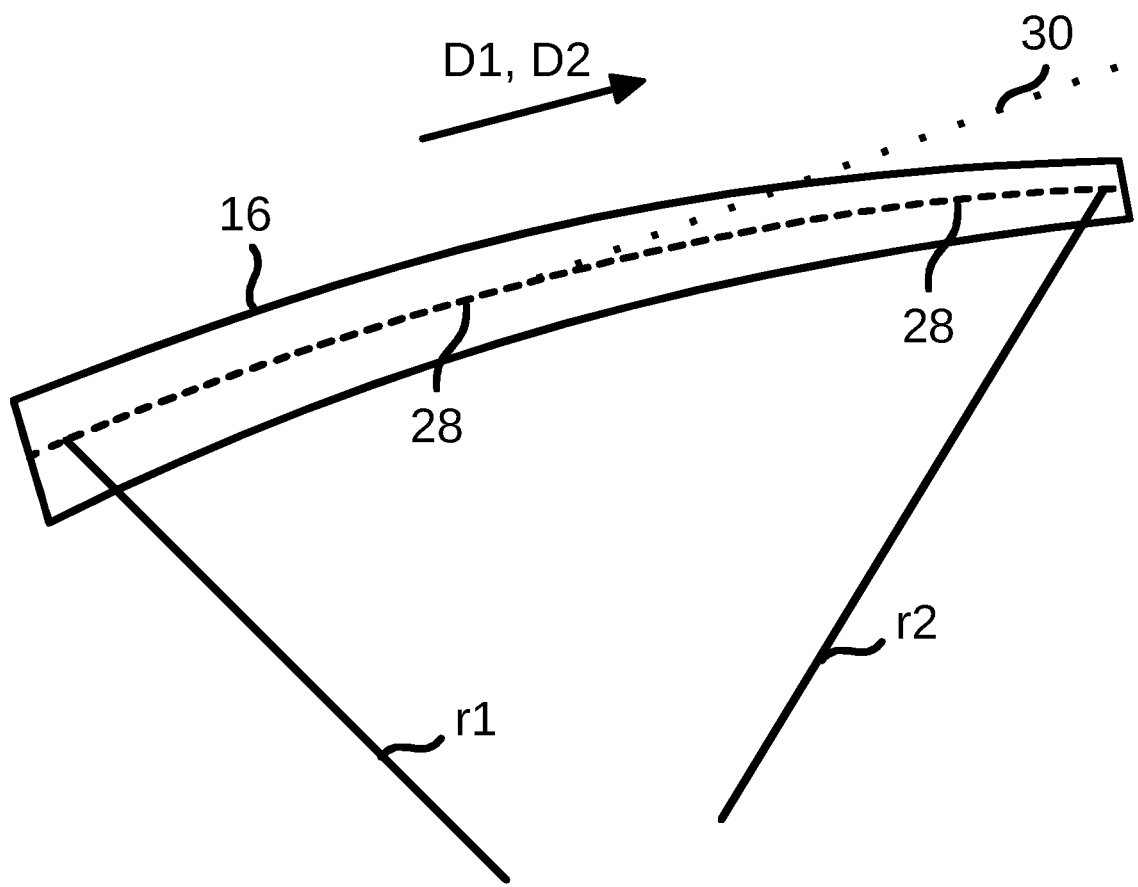
FIG. 3 depicts a schematic front view of a slat structure equipped with a piccolo tube according to an exemplary embodiment.

Referring now to FIG. 3 showing slat 16 in which a piccolo tube 28 indicated by a broken line is arranged. Slat 16 forms an airfoil structure arranged in an area of the airfoil arrangement 18 in which the engine 20 is attached, and at least a portion of slat 16 is curved, e.g. as described above.

The piccolo tube 28 extends in a longitudinal direction D1 and is installed in the longitudinal direction D2 of slat 16, i.e. parallel to the wing's leading edge. In this example, the longitudinal direction D1 of the piccolo tube 28 is arranged in parallel to the spanwise direction S.

The piccolo tube 28 is adapted to the slat curve, i.e. to the curvature of slat 16. The piccolo tube 28 has a curvature with a constant curvature radius. Thus, the curvature radius r1 at one point of the slat 16 is equal to the curvature radius r2 at another point of the slat 16. For clarity, a dotted line 30 is additionally shown in the figure, indicating the course of a conventional, straight piccolo tube.

In other embodiments, the curvature radius is not constant, i.e. r1 is different from r2, depending on the curvature of the airfoil arrangement in which it the piccolo tube is arranged.

Figure 4:
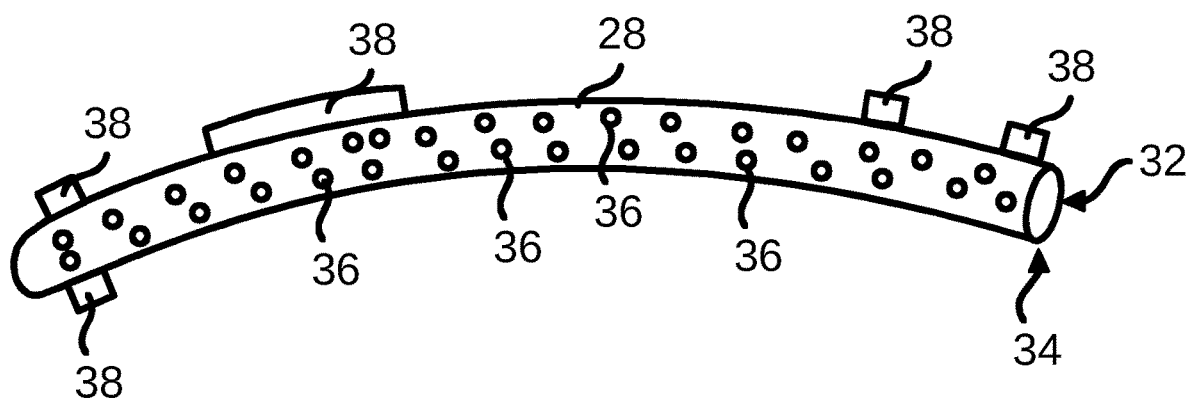
FIG. 4 depicts a schematic view of a piccolo tube according to an exemplary embodiment.

FIG. 4 shows more details of the piccolo tube 28. The piccolo tube 28 is formed as a longitudinally extending, curved body defining an air duct 32 in its interior. One end of the piccolo tube 28 is configured as a connector element 34 for connecting the piccolo tube to a supply source not shown in the figure, in order to receive hot air from the supply source. The hot air supplied through connector element 34 into duct 32 is e.g. bleed air extracted from a compressor part of engine 20, which may be cooled down to a predetermined temperature.

A plurality of outlet openings 36 are arranged along air duct 32 to eject the hot air from the piccolo tube 28 arranged within slat 16, and to blow it to the inner side of slat 16 along its length and in different radial directions, so that the hot air supplied in duct 32 is distributed along the inner side of slat 16.

In this Figure, the piccolo tube 28 is shown in a position in which it is installed in the slat 16 and finally in the aircraft 10 after assembly. In this state, the piccolo tube 28 is bended vertically, corresponding to the curve of the slat 16 and corresponding to the circumference 22 of the engine 20 attached below the airfoil arrangement 18 (see FIG. 1b). That means that the curve formed by piccolo tube 28 has at least a direction component in the vertical direction V shown in FIG. 1b. Here, the piccolo tube is bended upwards to partially surround the engine 20. Of course, in other embodiments, it can also be bended downwards, depending on the position of the slat 16 or of engine 20.

The piccolo tube 28 comprises different kinds of guiding elements 38 which help during installation. The guiding elements 38 may be integral to the piccolo tube 28 and facilitate assembly and disassembly of the curved piccolo tube 28, since without these guiding elements assembly and disassembly of a curved piccolo tube might be more complicated than in case of a straight one.

Figure 5:
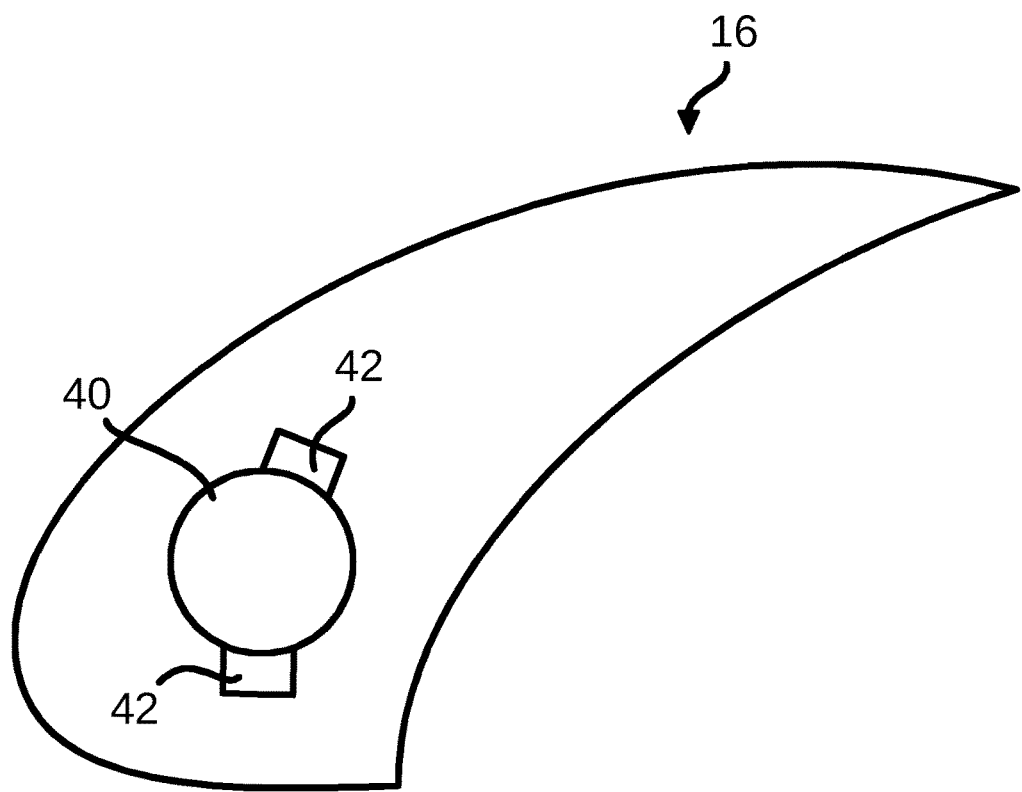
FIG. 5 depicts a schematic sectional view of a slat according to an exemplary embodiment before insertion of the piccolo tube.

FIG. 5 shows slat 16 according to an exemplary embodiment. It comprises a piccolo tube hole 40, which is formed to receive the piccolo tube 28. Further guiding elements 42, which may form e.g. grooves, recesses, protruding portions etc., are formed in slat 16 at different positions at the edge of the hole 40 which surrounds the piccolo tube after being installed in the slat 16. The guiding elements 42 are formed as counterparts to the guiding elements 38 arranged at the piccolo tube 28. They ensure that the piccolo tube 28 can be inserted smoothly and in a correct position into slat 16.

Figure 6:
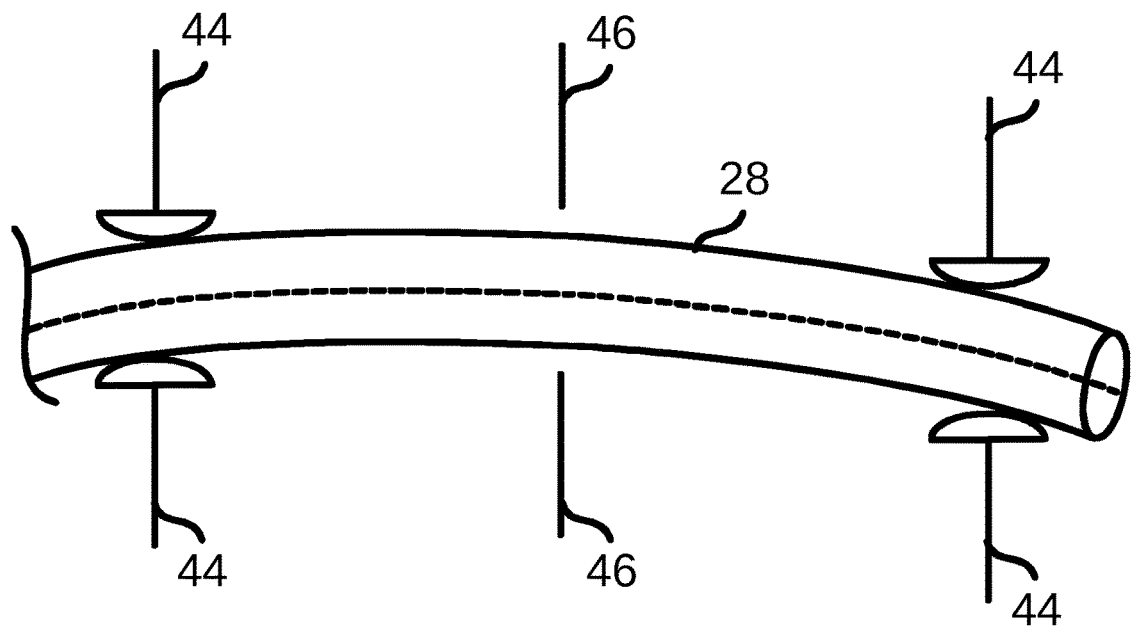
FIG. 6 depicts a schematic view of a portion of the piccolo tube according to an exemplary embodiment supported in the slat structure of FIG. 5; and, FIG. 7 depicts a schematic view showing the installation of the piccolo tube an exemplary embodiment in a slat.

FIG. 6 shows schematically the piccolo tube 28 supported in the airfoil or slat structure. Tube cut-outs in several piccolo tube support ribs 44 surround and contact the piccolo tube 28, thereby supporting and fixing the piccolo tube 28 within the airfoil or slat structure. Further tube cut-outs in other ribs 46 are provided, which have no support interface to the piccolo tube 28. The ribs 46 may e.g. be normal slat top skin ribs. The clearance of the tube cut-outs in the ribs 44, 46 is adapted accordingly, to ensure that ensure that the piccolo tube 28 can be smoothly inserted and secured in the correct position in slat 16.

The curved piccolo tube 28 having a constant radius results in minimal cut-outs in the ribs and optimal support conditions. Of course, other designs are possible with adaptations to rib cut-outs and support design.

The support of the piccolo tube 28 in the ribs 44, 46 should be rounded to achieve a line contact to reduce problems or damages during installation and service.

Figure 7:
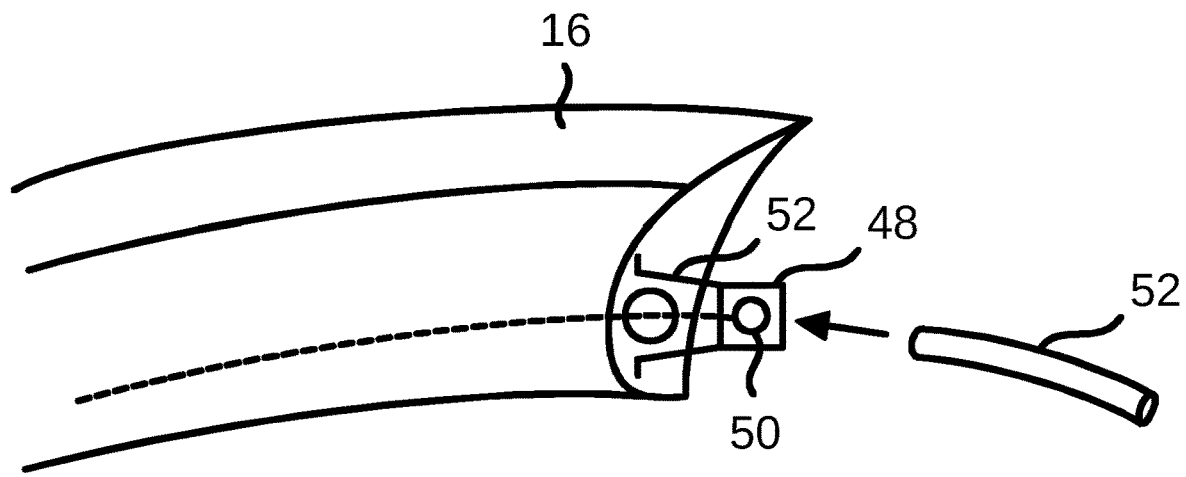

FIG. 7 depicts a schematic view showing a step during installation of the piccolo tube 28 in slat 16. The piccolo tube is inserted at one end of slat 16 and pushed lengthwise into slat 16. During insertion, the curved piccolo tube slides along a curved path within the curved slat 16, as indicated in the figure by a broken line.

A guiding tool 48 configured for being removably attached to the front end of slat 16 helps during installation. It is designed just for assembly and will be removed before flight. The guiding tool 48 is formed by a guiding frame or plate comprising a central hole 50 and one or more distance elements 52 for contacting the slat 16 during installation, in order to position the hole 50 at a predetermined distance from the insertion point in slat 16. Thus, a correct insertion is ensured.

The various guiding elements, receiving portions, cut outs and the removable guiding tool described above ensure a quick and safe installation of the curved piccolo tube in the airfoil structure.

After installation in slat 16 or in another airfoil structure, the piccolo tube 28 is connected to a supply source which supplies heated air, preferably bleed air, to the piccolo tube. Thus, a de-icing system is formed within the slat 16. A curved slat or airfoil structure equipped with the piccolo tube and the de-icing system is created.

The piccolo tube as described above removes significantly the limitations and constraints imposed hitherto on the layout of slats or other airfoil structures when designing a curved airfoil structure with a de-icing system. The piccolo tube may be used as well in an airfoil structure without a slat, like e.g. in a fixed leading edge module of the wing.

More design options for modifications are provided, e.g. in case that anti-icing performance needs to be increased, because interface points, slat rib cut-outs, spar positions etc. are less limited due to the piccolo tube according to the invention.

In particular, the piccolo tube adapted to the slat or airfoil curve helps increasing the options for slat and airfoil design and for piccolo tube design.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A piccolo tube for an aircraft including an airfoil structure, the piccolo tube having a shape extending in a longitudinal direction and configured to be installed in the airfoil structure of the aircraft in the longitudinal direction of the airfoil structure, the piccolo tube comprising:
   a connector element for receiving heated air from a supply source,
   a longitudinally extending air duct having a plurality of outlet openings arranged
   along the air duct, for supplying and distributing the heated air along the inner side of the airfoil structure, wherein the airfoil structure has a curvature in a longitudinal direction along the entire length of the airfoil structure,
   wherein the piccolo tube is curved having a curvature along an entire length of the piccolo tube, and configured to the curvature of the airfoil structure in the longitudinal direction, and
   wherein at least a portion of the curvature of the airfoil structure is configured to contour an outer circumference of an engine of the aircraft.

2. The piccolo tube according to claim 1, wherein at least a portion of the piccolo tube has a constant curvature radius.

3. The piccolo tube according to claim 1, wherein at least a portion of the piccolo tube is bended vertically in the installed state.

4. The piccolo tube according to claim 1, wherein the airfoil structure is a slat.

5. The piccolo tube according to claim 1, further comprising one or more guiding elements integrally formed with the piccolo tube and configured for guiding the piccolo tube during assembly in the airfoil structure.

6. The piccolo tube according to claim 1, further comprising a removable guiding tool for guiding the piccolo tube during assembly in the airfoil structure.

7. A de-icing system for an airfoil structure of an aircraft, comprising a piccolo tube according to claim 1 and a supply source for supplying heated air to the piccolo tube.

8. An airfoil structure for an aircraft, comprising a piccolo tube according to claim 1.

9. The airfoil structure according to claim 8, wherein at least a portion of the piccolo tube and the airfoil structure are bended vertically in the assembled state of the aircraft.

10. The airfoil structure according to claim 8, wherein at least a portion of the curvature of the airfoil structure is adapted to an outer circumference of an engine of the aircraft.

11. The airfoil structure according to claim 8, wherein the airfoil structure is a slat.

12. The airfoil structure according to claim 8, further comprising one or more guiding elements integrally formed with the airfoil structure and configured for guiding the piccolo tube when it is installed in the airfoil structure.

13. The airfoil structure according to claim 8, further comprising one or more ribs having a cut out for supporting the piccolo tube in the airfoil structure.

14. An aircraft, comprising a de-icing system according to claim 7.

15. An airfoil structure for an aircraft, comprising a de-icing system according to claim 7.

16. An aircraft, comprising an airfoil structure according to claim 8.

* * * * *